Nov. 6, 1956  W. H. CRISP  2,769,355
FLUTED CUTTING TOOLS
Filed Oct. 7, 1952
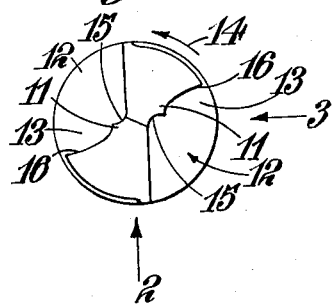
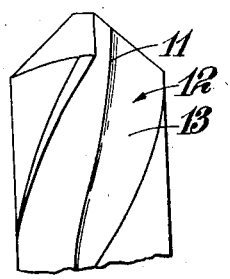
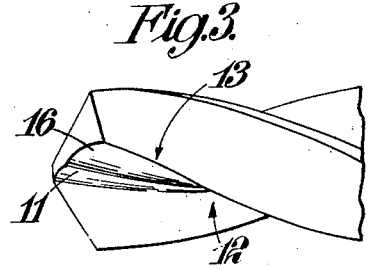
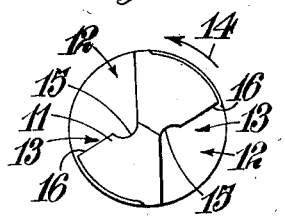
*Inventor*
*William Henry Crisp*

United States Patent Office 2,769,355
Patented Nov. 6, 1956

2,769,355

FLUTED CUTTING TOOLS

William Henry Crisp, Beauchief, Sheffield, England, assignor to Firth-Brown Tools Limited, Yorkshire, England, a British company Application October 7, 1952, Serial No. 313,571

Claims priority, application Great Britain October 12, 1951

1 Claim. (Cl. 77—70)

The invention relates to drills, reamers and like cutting tools of the kind (hereinafter referred to as the kind described) having straight or helical flutes.

It is an object of the invention to provide on a tool of the kind described simple means for breaking up the material removed by the tool into small pieces and thereby to facilitate the clearing of the material from the flutes.

According to the invention a tool of the kind described is characterised by a rib extending lengthwise of each flute and on the rearwardly directed face thereof (considered in relation to the direction of rotation).

Preferably the rib is spaced, in the radial direction, by only a small distance from the base or root of the flute.

In use a chip as it is being cut by a normal tool of the kind with which the invention is concerned slides over the forwardly directed face of the flute with a radially inwardly directed component of movement and the chip may be formed into a coil by bending as it passes around the bottom of the flute. The provision of the rib according to the invention substantially increases the sharpness of bend imparted to the chip and consequently tends to break the chip into small pieces.

Two specific constructions of drills embodying the invention will now be described by way of example and with reference to the accompanying drawings, in which:

Figure 1 is an end view of a drill embodying the invention,

Figure 2 is a side view of the drill as seen in the direction indicated by the arrow 2 in Figure 1, Figure 3 is a side view of the drill as seen in the direction indicated by the arrow 3 in Figure 2, and Figure 4 is an end view of another drill embodying the invention.

In the drills shown in the drawings ribs 11 extend lengthwise of each helical flute 12. The ribs 11 are provided on the rearwardly directed or trailing face 13 of each flute 12, the direction of rotation of the drills being indicated by arrows 14. The portion 15 of the rear face 13 of the flute between the base or root of the flute and the rib 11 is of sharply curved concave form.

In the construction shown in Figures 1 to 3, the remainder 16 of the face 13 is of concave form of greater radius, and the edge of the rib 11 is comparatively sharp.

In the construction shown in Figure 4, the remainder 16 of the face 13 is substantially flat and the rib 11 is formed by the inner edge of the flat portion 16. The concave portion 15 may be likened to a groove extending along the flute 12.

The present invention may be used in combination with grooves provided in known manner, on the cutting flanks of a drill point or in the drill flutes.

I claim:

A cutting tool having a plurality of concave helical flutes extending longitudinally along the surface of the tool and having an upstanding rib of constant height throughout its length extending longitudinally along the trailing face of each flute, considered in relation to the direction of rotation of the tool, said rib being spaced away from the root of the flute by a small uniform distance throughout its length and the surface of each flute between the root thereof and the top of the rib being continuously smoothly concave, and having a radius of curvature substantially smaller than that of the surface of each flute between the top of the rib and the heel of the flute, the height of the rib and the curvature of the concave portion of the surface of the flute between the top of the rib and the root of the flute being selected so that they cause the chip cut by the drill to be sharply bent so as to break.

References Cited in the file of this patent

UNITED STATES PATENTS

| | | |
|---|---|---|
| 750,537 | Hanson | Jan. 26, 1904 |
| 1,069,930 | Down | Aug. 12, 1913 |